United States Patent
Case et al.

[15] 3,650,798
[45] Mar. 21, 1972

[54] METHOD FOR CONTINUOUS COATING OF METALLIC PRODUCTS WITH FUSIBLE PULVERULENT MATERIALS

[72] Inventors: John S. Case, Baltimore, Md.; William B. Johnson, Marion, Mass.

[73] Assignee: Anchor Post Products, Inc., Baltimore, Md.

[22] Filed: Nov. 17, 1969

[21] Appl. No.: 877,494

Related U.S. Application Data

[63] Continuation of Ser. No. 598,842, Dec. 2, 1966, abandoned.

[52] U.S. Cl...............................117/21, 117/29, 117/71 M, 117/71 R, 117/75, 117/218, 117/232, 118/405
[51] Int. Cl..............................................B44d 1/094
[58] Field of Search...............117/21, 29, 31, 71, 75, 127, 117/128, 128.4, 132 C, 217, 218, 227, 230, 231, 232

[56] References Cited

UNITED STATES PATENTS

| | | | |
|---|---|---|---|
| 2,478,940 | 8/1949 | Pape | 117/16 |
| 2,581,938 | 1/1952 | Swanson et al. | 117/16 |
| 2,832,511 | 4/1958 | Stockdale et al. | 117/16 |
| 2,961,341 | 11/1960 | Long | 117/218 |
| 2,972,331 | 2/1961 | Limberger | 117/21 |
| 2,994,110 | 8/1961 | Hardy | 117/16 |
| 3,008,848 | 11/1961 | Annonio | 117/21 |
| 3,074,808 | 1/1963 | Harrison | 117/18 |
| 3,088,847 | 5/1963 | Pines | 117/132 BS |
| 3,093,177 | 6/1963 | Villo | 117/128.4 |
| 3,140,195 | 7/1964 | Nagel | 117/29 |
| 3,145,127 | 8/1964 | Baun | 117/21 |
| 3,167,442 | 1/1965 | Brooks | 117/21 |
| 3,186,860 | 6/1965 | Jones | 117/18 |
| 3,197,324 | 7/1965 | Brooks | 117/21 |
| 3,277,042 | 10/1966 | Richart | 117/21 |
| 3,351,504 | 11/1967 | De Hart | 117/21 |
| 3,364,053 | 1/1968 | Beike | 117/21 |
| 3,376,151 | 4/1968 | Okamoto et al. | 117/18 |
| 3,442,748 | 5/1969 | D'Huart | 117/16 |
| 3,459,584 | 8/1969 | Caldwell | 117/75 |
| 3,532,531 | 10/1970 | Stallard | 117/21 |

*Primary Examiner*—William D. Martin
*Assistant Examiner*—Raymond M. Speer
*Attorney*—Walter G. Finch

[57] ABSTRACT

A method is described for the coating of running strands or webs with a thermoplastic protective layer. The successive steps comprise the application of a primer and the hot air current drying and curing of same supplemented by inductive heating. The temperature is next raised in two successive stages by inductive type heaters, the later stage while the strand or web is vertically traversing the length of a continuously replenished dense cylindrical bed of powdered vinyl polymer or the like. The replenishment as well as cooling of the powder is accomplished through a recirculatory arrangement powered by air nozzles. Alternate coating materials are proposed including polyolefins containing compounds of metal.

9 Claims, 2 Drawing Figures

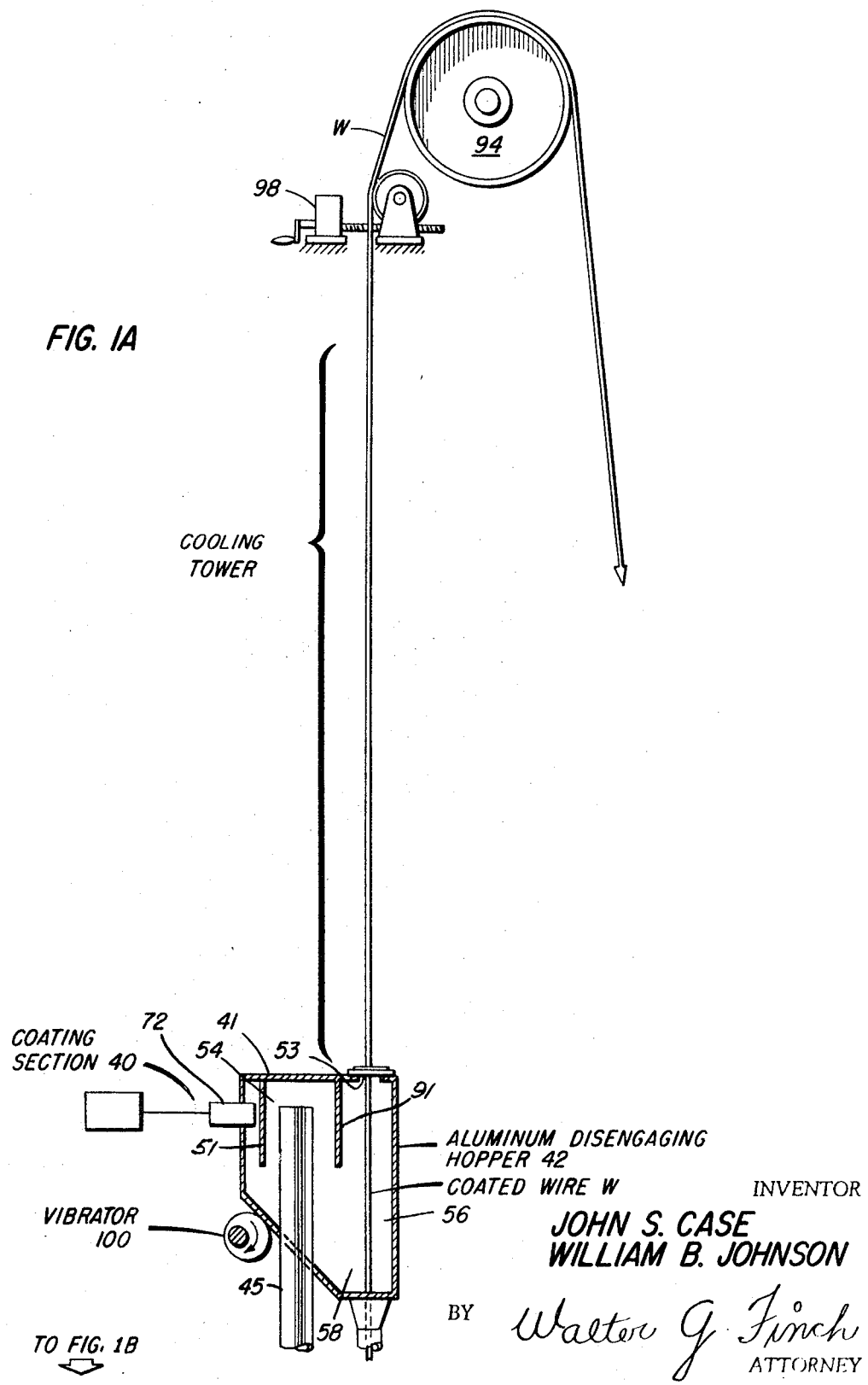

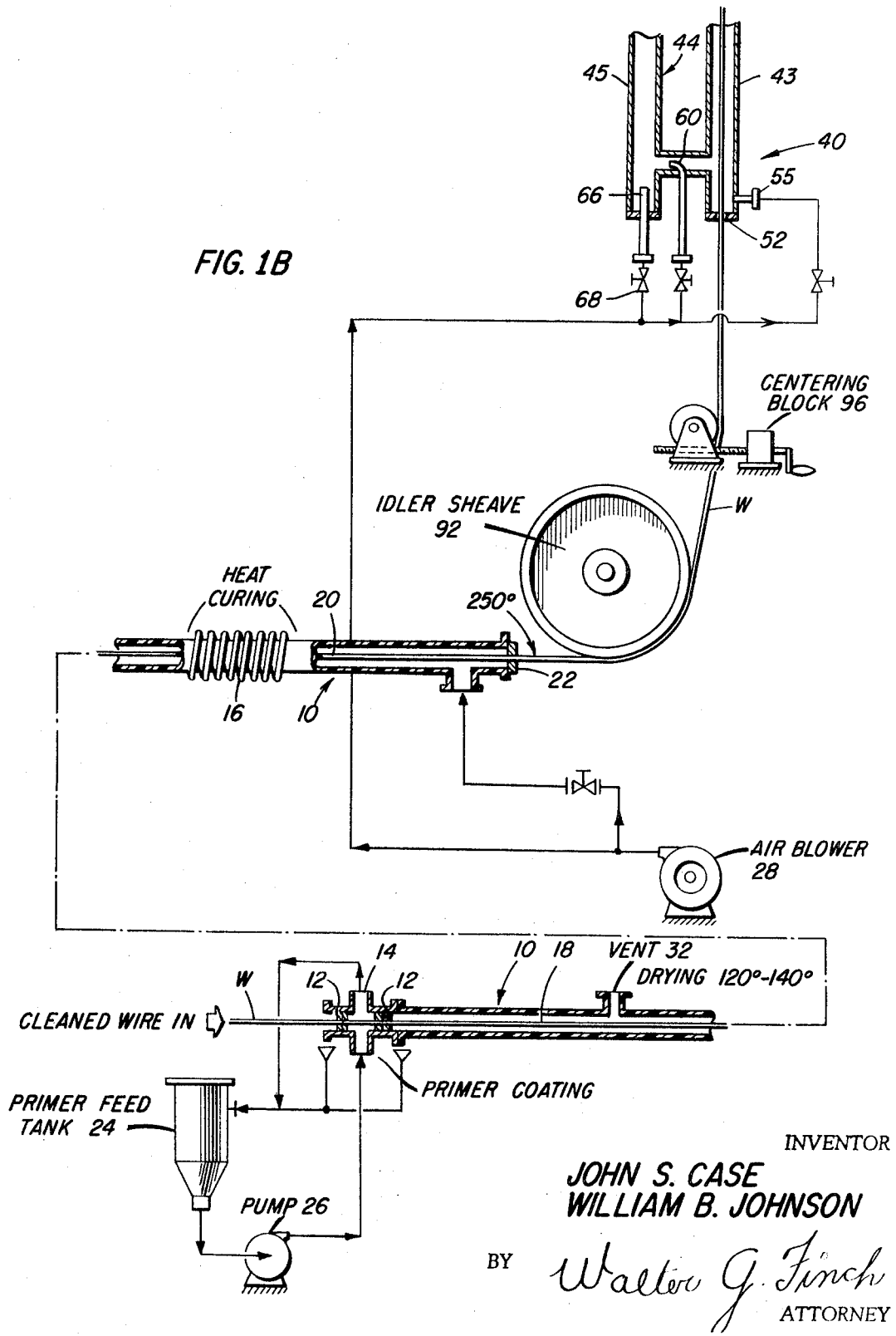

METHOD FOR CONTINUOUS COATING OF METALLIC PRODUCTS WITH FUSIBLE PULVERULENT MATERIALS

This patent application is a continuation of U.S. Pat. application Ser. No. 598,842, filed by applicants on Dec. 2, 1966, for "Method and Apparatus for Continuous Coating of Metallic Products with Fusible Pulverulent Materials" and now abandoned.

This invention relates generally to the manufacture of coated articles, and more particularly it pertains to a technique and apparatus for applying non-porous plastic films to wire in a continuous process.

Although the invention is particularly concerned with the coating of metallic wire it is to be understood that the invention is equally applicable to the coating of other metallic articles such as flat sheets and strips. The term "wire" as used hereinafter throughout the description and claims is therefore intended to cover such other metallic articles.

Metallic platings have long been used for weather proofing wire. However, a metallic coat of this nature does not always survive the bending and forming operations during subsequent weathering as for fence fabric.

It is an object of this invention, therefore, to provide a process for forming and bonding a tough coat of plastic to wire for a more durable element for fencing.

Another object of this invention is to provide an apparatus for the application of thermoplastic coatings to continuously moving filaments.

Other objects of this invention are to provide a continuous metal coating process with fusible pulverulent materials and products formed thereby, which is economical, efficient and reliable, and which has many advantages over prior art processes and products.

According to one aspect of the invention there is provided a process for coating metallic wire with plastic, comprising primer coating said wire, applying fusible plastic, comprising primer coating said wire, applying fusible plastic powder to the primer coating on said wire, and fusing said powder to said coating to thereby obtain a plastic coating on said wire.

According to another aspect of the invention there is provided apparatus for coating metallic wire with plastic material, comprising structure for conducting said wire along a path, means for priming, drying, and heating said wire along a portion of said path, means for applying compacted fusible plastic powder in small amounts to said heated wire, whereby said fusible plastic powder fuses to a thin coating and means for cooling said coated wire along a successive portion of said path.

The invention will now be described by way of example with reference to the accompanying drawing in which:

FIG. 1A is a schematic depiction of an apparatus for coating wire incorporating features of this invention; and FIG. 1B is a continuation of FIG. 1A in a downward direction.

Referring now to the details of the invention as shown in FIGS. 1A and 1B of the drawings, the apparatus for carrying out the process comprises a primer treating section 10 which is made of dielectric material such as a length of fiber glass tubing. A pair of spaced felt washers 12 are mounted in one end of the treating section 10, the space therebetween defining a primer coating chamber 14.

An induction heating coil 16 is positioned on the tubing of section 10 somewhat beyond the center, defining first a drying chamber 18, then a curing chamber 20. The latter chamber 20 is closed at the end by an asbestos washer 22.

Primer for the chamber 14 is circulated therethrough in a closed loop including a primer feed tank 24 and a pump 26. Air for the chambers 18 and 20 is provided by an air blower 28. A vent 32 near the center of chamber 18 exhausts the spent air from chambers 18 and 20.

The next-in-line unit of the apparatus is a coating section 40 comprising a disengaging hopper 42 and an H-shaped coater-circulator 44. A short arm 43 of the H-shaped coater-recirculator 44 depends from the lower most end of the hopper 42 with a felt washer 52 closing the bottom end.

The lift or long arm 45 of the H-shaped recirculator 44 extends within the hopper 42 nearly to the top cover 41 thereof in a chamber 54. The remainder of the hopper 42 is occupied by another chamber 56, this one above and coextensive with the short arm 43 of the H. These two chambers 54 and 56 freely communicate at their bottom ends through an aperture 58 and thus close a recirculating system including the arms 43, 45 of H-shaped coater recirculator 44 for coating powders introduced from time to time to hopper 42 through its cover 41.

An aperture washer 53 is located in the top of the chamber 56 to essentially confine the recirculating system mentioned above.

The operation of recirculation is accomplished by air introduced at a valved inlet 60 at the cross arm of the H-shaped recirculator 44. This inlet 60 is bent or reclined in the desired direction of circulation as shown and receives air from blower 28.

Another valved air inlet 66 extends coaxially upward into the lift or long arm 45. The latter inlet 66 is served by an air valve 68.

Just above washer seal 52 a small portion of air is provided at an inlet 55 to prevent powder from entering this seal section. This air pressure is adjusted so that none enters the upper portion of short arm 43 but instead is swept along with the recirculating air from inlet 60.

A valved restricted opening 72 is located close to the top of hopper 42 on the side remote from chamber 56 to vent the spent air from the coater-recirculator 44.

Wire W to be coated is reeved through the apparatus in the order of description recited above using the felt and asbestos washers mentioned as ingress and egress seals. Idler sheaves 92 and 94 are used to change the direction of the wire W and adjustable centering blocks 96 and 98 to guide it accurately.

For coating 20 gauge steel wire with vinyl thermoplastic, the following procedure has been found satisfactory using a primer of thermosetting material in solvents and containing metal pigments higher in the electromotive series than iron.

Wire W which has been cleaned of scale and grease by solvents and pickling, or grit blasting is passed through the primer coating chamber 14 wherein the primer is in a continuous state of agitation to prevent settlement of the metal pigments by vigorous circulation through the coating chamber 14 and within the primer feed tank 24.

A film of primer including the solvents of about 0.5 to 1 mil thick is deposited on the wire W and any excess is removed when the wire passes through felt wipers 12. This corresponds to a cured film thickness of approximately 0.1 to 0.2 mils in the cured condition. The wire W then passes through a drying chamber 18 where it first contacts warm (about 120° to 140° F) fresh air flowing in a countercurrent direction at velocities in the tunnel in the order of 20 to 30 f.p.s. The temperature in the tunnel gradually increases as the wire W progresses toward coil 16.

The main purpose of the air is to drive off solvents to permit curing but at such a rate that a skin does not form on the outer surface and thus entrap moisture which could cause bubbling of the coating. When the coating is essentially solvent-free, heat is induced in the wire by the induction heating coil 16 surrounding it.

Heat input in the curing chamber 20 can be controlled by power input to the induction coil 16. Temperature of the wire leaving the curing tunnel is about 650° to 700° F. At this stage the primer coating has cured sufficiently to permit passage over the rimmed idler sheave 92 without removal of the primer in order to change direction from horizontal movement to the wire to vertical.

The small adjustable centering block 96 is next in line to insure centering of the wire W through the vertical coating section 40.

The still-heated wire W now passes into the coater circulator 44. In this section, unaerated vinyl polymer powder is moving in a countercurrent direction to the movement of the wire W.

The movement of the powder is important at this point so that it will continuously fill-in voids created by the melting of the powder on the surface of the wire W but equally important is the fact that the powder is in a highly compacted state in an unaerated condition.

Compacting of the powder at this stage is aided by the use of air or electrically operated vibrators 100 attached to the equipment. The avoidance of air entrapped in the powder eliminates voids in the coating during fusion of the powder and thus prevents any possibility of pinholes in the outer coating of the wire W. Compacted, unaerated powder also prevents air channels forming along the wire path which would lead to localized cooling of the wire surface. The result is improved coating continuity and greater operating speed.

Circulation of powder is established by aerating the powder in lift arm 45 which is parallel to the coating section arm 43. At this point, the powder which has been through the coater 44 is cooled by the lifting aeration action.

During the coating operation, part of the circulating powder immediately adjacent to the fused surface picks up heat due to conduction. Unless the powder is continuously cooled as mentioned there is a tendency for it to form small, partially fused spheres which would ultimately result in nonuniform coatings.

It should be noted that air which is introduced into the coating section 40 does not enter the short vertical arm 43 but passes up through the lift or long arm 45 since the differential pressure across the lift arm is lower than that in the coating section short arm due to the difference in densities of the powder therein.

From the lift arm 45, the powder and air mixture enters the disengaging hopper 42 to separate the two materials. The air travels in a re-entrant path to attain a high separation efficiency. This is accomplished by the baffles 51 and 91 which divide the hopper into two sections 54, 56 except at the bottom aperture 58 which permits the separated powder to return to the short arm 43 of coating section 40.

The air leaves the disengaging hopper 42 by opening 72. This opening 72 is located close to the top of the hopper and any powder which may escape with the spent air is captured by a filter before being vented to atmosphere.

The wire at this state contains residual heat, the rate of heat transfer to the outer surface of the coating is relatively slow due to the fact that the plastic material is a poor heat conductor. Therefore, this heat is removed in a long vertical open travel of the wire (cooling tower or equivalent) before passing over the return idler sheave 94 for cooling and ultimate disposition.

For coating 10 gauge steel wire with polyolefin thermoplastics, such as polyethylene of polypropylene containing metal in flake or powdered form, metal oxides, metal hydroxides, metal carboxyl groups, which will promote cross-linking reactions under the heat conditions for coating and including heat and UV stabilizers as well as pigments are used. A different primer is here used. This primer is a weak acid solution of a base metal higher in electromotive series than iron.

The wire follows the same general steps as in the previous example but there are some differences, as will now be discussed. In the curing tunnel, the weak acid primer is dried on the surface of the wire W and again the thickness of coating is about 0.1 to 0.2 mils. The temperature of the wire W leaving the curing section is about 200° to 230° F.

In this section and in the coating section, cross-linking reactions occur which form molecular bonds between the surface of the metal of the wire W and the metal additives which have been previously mixed into the powdered polyolefin material. These reactions upgrade the physical and chemical properties of the coating as compared with a virgin polyolefin material, such as much higher temperature properties, higher tensile strengths, greater chemical resistance to corrosive atmosphere, improved weathering properties, greater abrasion resistance, and the like. Again the procedure of coating by this technique offers considerable advantages in temperature control and uniformity of temperature which is extremely important when cross-linking reactions take place. One can also appreciate that the continuous cooling of powder is an essential requirement.

The technique for coating the same wire as in the previous example with thermosetting materials such as epoxy-polyamide prepared by partial (B-stage) curing to a solid state and then pulverizing with pigments and stabilizers is as now described.

The primer is a phosphate treatment (bonderizing). The phosphate treatment of the wire is similar to the weak acid treatment described above. In the coating and post heating sections, however, the throughput rate is slowed down because of the curing times involved during the coating process. Normally, if high temperature fast cures are employed there is a tendency to produce brittle type coatings which would have relatively poor impact properties for wire coatings.

Although the examples described herein are for the coating of steel wire the process is not restricted to the use of steel nor of wire. Essentially, any metal strip or web may be coated in the process although the efficiency of the induction heating unit will be different for other metals and shapes. For instance, in the case of copper the efficiency of heating by this technique may be impractical in which case other types of heating systems may be used such as radiant heating, convection heating, resistance heating, or combinations of these.

The same techniques of coating would be applied, however. Likewise filaments in other forms than round wire, such as flat coil, tubing, and the like may be coated in similar equipment. In addition the coating of metals with pulverulent materials in an unaerated, compacted state, wherein the powder is maintained in a circulating condition by the use of an air lift, vacuum lift, mechanical lift such as a screw conveyor or similar powder lifting device is of extreme importance in obtaining non-porous coatings particularly when coating at relatively fast rates. This same technique may be applied in systems other than the one described herein, even in non-continuous dipping type operations by preheating of the metal part prior to immersion in the compacted moving powder stream. Other means of separating the air and powder mixture from the lift leg may be employed such as a cyclone separator, dust filter, and the like.

It is also possible, if more convenient, to reverse the travel direction of the wire through the coating section 40.

Obviously, many other modifications and variations of the present invention are possible in light of the above teachings. It is, therefore, to be understood that within the scope of the appended claims the invention may be practiced otherwise than as specifically described.

What is claimed is:

1. A process for coating the surface of an elongated article, comprising, continuously moving an elongated article longitudinally upwardly, continuously primer coating the surface of said elongated article, heating the coated article to cure the primer coating on the surface thereof, continuously applying a pulverulent flowing material in an unaerated compacted-mass condition downwardly about said primer coated surface of the heated, primed elongated article, fusing pulverulent material to said surface to obtain thereby a coating on said surface, continuously removing excess pulverulent material from the lower end of the compacted mass, and continuously cooling portions of said excess pulverulent flowing material taken from the lower end of said compacted mass with a gaseous carrying medium in a circulating stream and returning said cooled portions of the excess pulverulent flowing material to the upper end of said compacted mass.

2. The process as recited in claim 1, and additionally the step of baffling and vibrating and thereby separating said cooled portion of the excess pulverulent material from the gaseous carrying medium for said excess pulverulent material during said returning of the cooled portion of the excess pulverulent flowing material to the upper end of said compacted mass.

3. The process of claim 1 in which said moving surface of said article is metallic.

4. The process as recited in claim 3, in which said primer is a thermosetting material and said pulverulent flowing material is vinyl polymer.

5. The process as recited in claim 3 in which said primer is a weak acid solution of a base metal higher in the electromotive series than the metal of the metallic surface, and the fusible plastic powder is polyolefin.

6. The process of claim 5 in which the polyolefin contains an agent for cross-linking with said metallic surface during fusing of said polyolefin to said surface.

7. The process of claim 5 in which the polyolefin contains powdered metal.

8. The process as recited in claim 1, wherein said pulverulent flowing material is applied in the same direction of movement as said moving surface.

9. The process as recited in claim 1, wherein said pulverulent flowing material is applied in an opposite direction of movement as said moving surface.

* * * * *